Dec. 17, 1968  T. J. SCHOENECKER ET AL  3,416,557
CHECK VALVE WITH WIPING ACTION
Original Filed April 29, 1964  3 Sheets-Sheet 1

INVENTORS.
THOMAS J. SCHOENECKER
ROBERT L. OLSON
BY
Hume, Groen, Clement & Hume
Attorneys.

INVENTORS.
THOMAS J. SCHOENECKER
ROBERT L. OLSON
BY
Hume, Groen, Clement & Hume
Attorneys.

Dec. 17, 1968  T. J. SCHOENECKER ET AL  3,416,557
CHECK VALVE WITH WIPING ACTION
Original Filed April 29, 1964  3 Sheets-Sheet 3

INVENTORS.
THOMAS J. SCHOENECKER
ROBERT L. OLSON
BY
Hume, Groen, Clement & Hume
Attorneys.

United States Patent Office 3,416,557
Patented Dec. 17, 1968

3,416,557
CHECK VALVE WITH WIPING ACTION
Thomas J. Schoenecker, North St. Paul, and Robert L. Olson, St. Paul, Minn., assignors to Union Tank Car Company, a corporation of Delaware
Original application Apr. 29, 1964, Ser. No. 363,547, now Patent No. 3,335,671, dated Aug. 15, 1967. Divided and this application Sept. 22, 1965, Ser. No. 509,661
5 Claims. (Cl. 137—242)

ABSTRACT OF THE DISCLOSURE

A check valve arrangement wherein a valve member overlies an inlet port having a planar surface surrounding it. The valve member includes a core having annular resilient lip means on it which engage and wipe the surface to clean it in normal operation of the valve arrangement.

---

This is a division of application Ser. No. 363,547, filed Apr. 29, 1964, now Patent 3,335,671.

It is an object of the present invention to provide an improved check valve arrangement which normally seats on a flat surface but readily accommodates irregularities in the surface.

It is a further object to provide a check valve arrangement which maintains a superior seal regardless of the presence of foreign matter particles or the like on the sealing surface.

The foregoing and other objects are realized in accord with the present invention by providing a pumping and injection system which delivers a chemical or chemicals at a constant rate under varying pressure conditions to be intimately mixed with another liquid. An aspect of the invention resides in the high volumetric efficiency maintained by the pump, with a constant pumping rate. Another aspect resides in the pump check valve arrangement, which contributes to the consistency of performance of the pump and the constant pumping rate by assuring a liquid tight seal under all operating conditions.

Yet another aspect of the invention resides in the injection mixing of chemicals being pumped into a second stream of liquid. The mixing accomplished is a uniformly thorough co-mingling of the two liquids. No substantial precipitate deposit is formed at the nozzle outlet of the injection arrangement to inhibit the injection flow of liquid.

The invention, both to its organization and method of operation, taken with further objects and advantages thereof, will best be understood by reference to the following description taken in connection with the accompanying drawings, in which.

Figure 1:
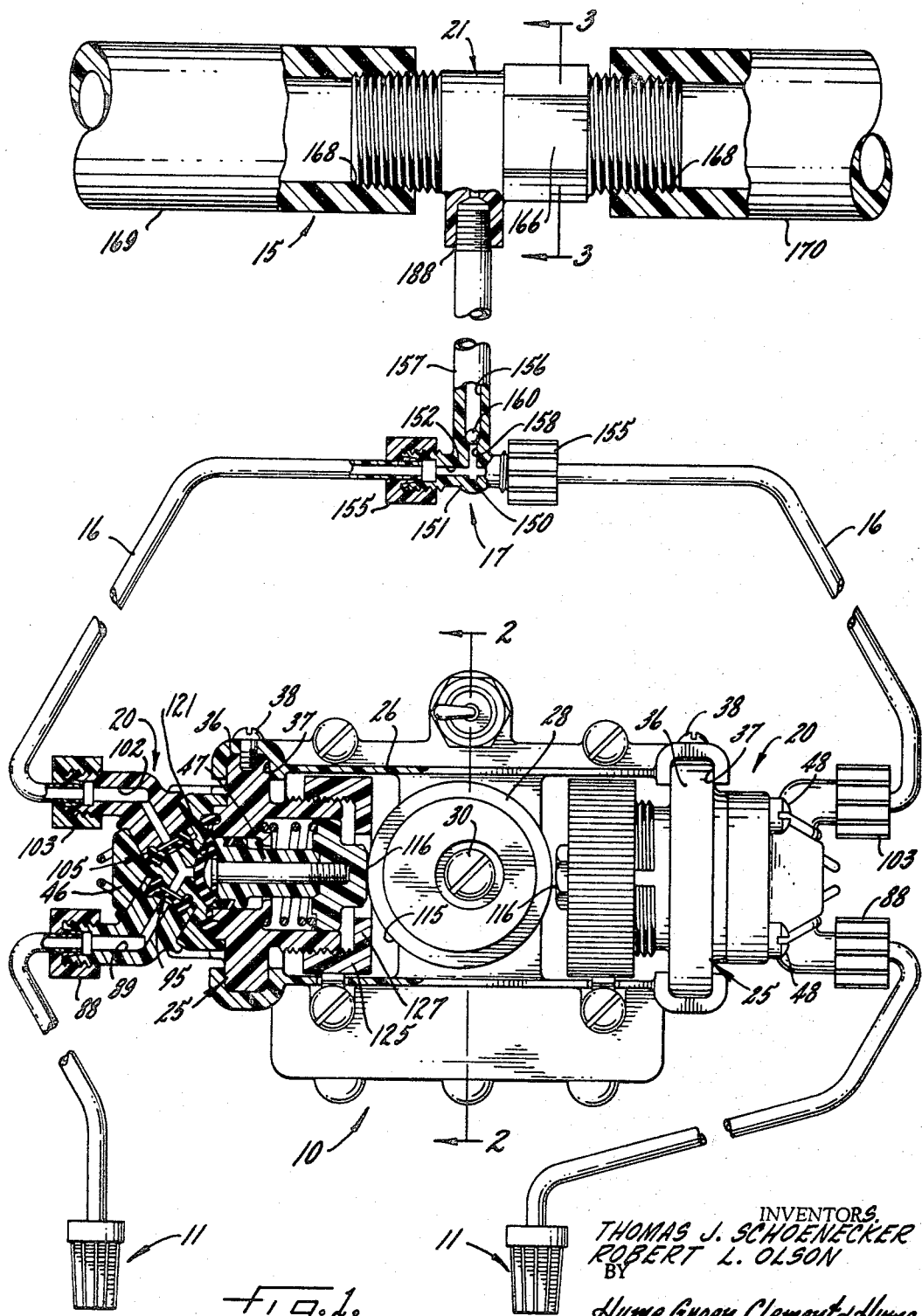
FIGURE 1 is a plan view, partially in section, of the liquid pumping and injection system embodying features of the present invention.

Referring now to the drawings, and particularly to FIGURE 1, a liquid pumping and injection system embodying features of the present invention is shown generally at 10. The system 10 is illustrated and described in the context of a chemical solution feed pump system and, as such, is designed to draw chemicals from two sources (not shown) through identical conduits 11 and pump the chemicals into a water supply line 15 or the like.

The liquid pumping and injection system 10 includes a dual pump assembly 20 which receives the liquid chemicals from the aforementioned sources through the inlet conduits 11 and delivers them under pressure to identical outlet conduits 16. The liquid chemicals from the outlet conduits 16 meet and pass through a flow rate indicator unit 17 and, thence, into the pipe 15, through an injector assembly 21 embodying features of the present invention.

The dual pump assembly 20 delivers liquid chemicals to the injector assembly 21 at a constant pumping rate regardless of variations in line pressure in the outlet conduits 16. The pump assembly 20 additionally maintains extremely high volumetric efficiency. It maintains this high volumetric efficiency, in the neighborhood of 95 percent or greater, substantially without malfunctions normally attributed to the presence of foreign material particles or precipitates, for example, in the chemical solutions.

The injector assembly 21 assures excellent chemical mixing with the water in the line 15. Furthermore, the injector assembly 21 substantially eliminates the problem of precipitate build-up with concomitant fouling of the injector assembly 21 due to the premature co-mingling of the introduced liquid chemicals and service line water, for example.

The present invention is described in the context of a pumping and injection system 10 for introducing a single chemical or two different chemicals into a water service line 15, as has been pointed out. It should readily be understood, however, that the system 10 is readily adaptable to pump virtually any type of liquid or liquids at a constant pumping rate regardless of line pressure variations, with an exceptionally high volumetric efficiency of 95 percent or greater, and with a very low incidence of malfunctions of any type, specifically those caused by the presence of foreign material particles or precipitate particles in the liquid chemicals. Furthermore, the injection assembly 21 embodying features of the present invention is readily adaptable to injecting various liquids into the flow stream of a second liquid although it finds its most advantageous application in the chemical solution pumping and injection system 10.

Figure 2:
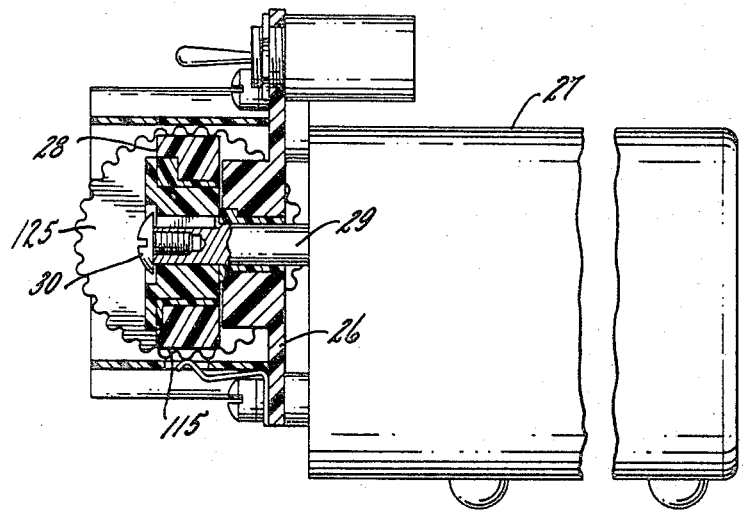
FIGURE 2 is a view taken along line 2—2 of FIGURE 1, partially in section.
Figures 3, 4:
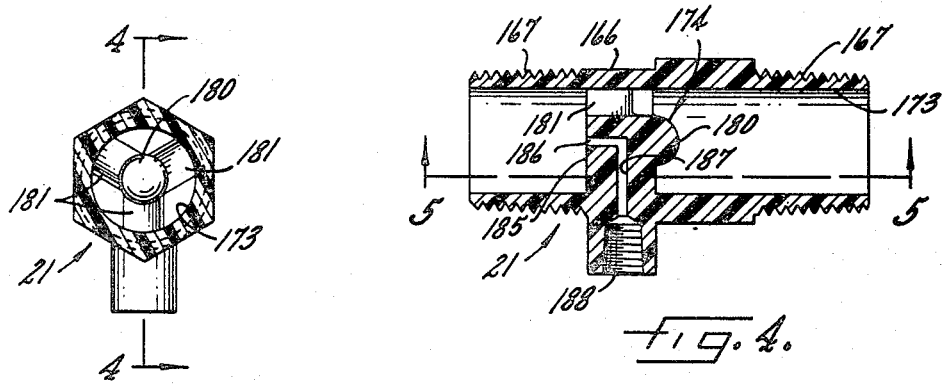
FIGURE 3 is a sectional view taken along line 3—3 of FIGURE 1.
FIGURE 4 is a sectional view taken along line 4—4 of FIGURE 3.
Figure 5:
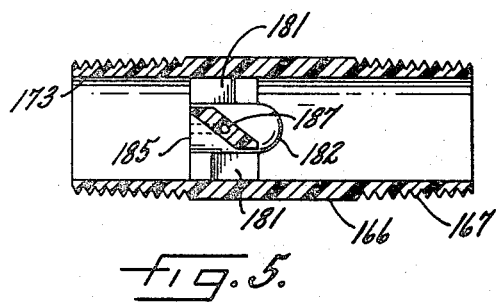
FIGURE 5 is a sectional view taken along line 5—5 of FIGURE 4.

The dual pump assembly 20 comprises a pair of identical pump units 25 removably seated in a mounting frame 26 in opposed relationship. A drive motor 27 (see FIGURE 2) mounted on a drive shaft 29 and retained thereon by a simple machine screw 30. Since the pump units 25 are identical, only the pump unit on the left in FIGURE 1 is described and illustrated in detail and corresponding reference numerals are applied to both pump units.

The pump unit 25 includes a generally cylindrical molded plastic cylinder block 35 having an annular shoulder 36 formed around its periphery and seated in a complementary enclosure 37 in the frame 26. A locking screw 38 holds the cylinder block 35 in place while permitting it to be readily inserted and removed.

Extending axially through the entire cylinder block 35 is a cylinder 40 having a smaller diameter outer section 41 and a larger diameter inner section 42 separated by an annular shoulder 43. A cylinder head 46 overlies the smaller diameter outer cylinder section 41 while a piston 47 is slidable in the cylinder 40.

The cylinder head 46 is a generally frusto-conical molded plastic body secured to the cylinder block 35 by conventional bolts 48. A diaphragm 50 embodying features of the present invention is clamped between the cylinder head 46 and the cylinder block 35, and secured to the piston 47.

The diaphragm 50 is fabricated of rubber or the like and includes an enlarged peripheral rim 51 seated in opposed annular grooves 52 formed in the cylinder block 35 and the cylinder head 46. The diaphragm 50 overlies the outer cylinder section 41 and defines a variable volume pumping chamber 54 between the diaphragm 50 and the cylinder head 46.

The diaphragm 50 is secured at its center to the piston 47 by a special machined thread shaft 56. The shaft 56 has a special head 57 which is molded into the back of the diaphragm 50. The bolt 56 extends through the piston head member 59 slidable in the inner cylinder section 41. An annular X-seal 60 seated in a suitably formed peripheral recess 61 in the piston head member 59 seals the head member 59 against the wall of the cylinder section 41. Movement of the piston head member 59 entirely out of the cylinder section 41 is prevented by the annular shoulder 43.

The bolt 56 is threaded into an enlarged piston head member 63 at its outer end 64. The enlarged piston head member 63 is slidable in the larger cylinder section 42 and retains a coil spring 65 between an annular spring seat 66 formed in the piston head member 63 and an annular spring seat 67 formed in the cylinder 40 around the shoulder 43. The coil spring 65 tends to bias the piston 47 and, accordingly, the diaphragm 50 away from the cylinder head 46.

The cylinder head 46 has a concave inner surface 70 which is concentric with the diaphragm 50. The diaphragm 50, in turn, has a thickened central portion 71 defining a convex outer surface 72 overlying the bolt head 57. According to the present invention, the inside radius of the segmentally spherical concave depression 70 in the head 46 is slightly smaller than the outside radius of the segmentally spherical convex surface 72 on the diaphragm 50. As will hereinafter be discussed in detail, this relationship contributes to high volumetric efficiency and assures the maintenance of a constant pumping rate with pressure variations in the conduits 16.

A Y-shaped constant volume chamber 75 is formed in the cylinder head 46 over the variable volume pumping chamber 54 and is in constant communication therewith through a leg 76. One arm 77 leading from the leg 76 of the constant volume chamber 75 terminates in an inlet check valve chamber 80, while the other arm 81 terminates in an outlet check valve chamber 82. The constant volume chamber 75 defines a minimum total volume space, between the chamber 54 and the check valve chambers 80 and 82, as will be recognized. This minimal volume chamber 75 communication with the check valve chambers 80 and 82 also contributes to the volumetric efficiency of the pump unit 25.

The inlet valve chamber 80 is generally cylindrical and is formed in the base of a socket 84 in which an inlet fitting 85 is seated. The inlet fitting 85 has a nurled coupling 88 securing it in fluid tight relationship to the inlet conduit 11 and contains an angular passage 89 in communication with the inlet conduit 11 and the inlet check valve chamber 80. A planar sealing surface 90 encircles the angular passage 89 in the check valve chamber 80 and a check valve member 95 embodying features of the present invention seats against the sealing surface 90 and is retained between a fitting 85 and the socket 84.

The outlet check valve chamber 82 is also generally cylindrical and is formed in the base of the socket 100 in which the outlet fitting 101 is seated. The outlet fitting 101 contains an angular passage 102 extending from the chamber 82 to the outlet conduit 16 and is connected in fluid tight relationship therewith by the nurled coupling 103. An outlet check valve member 105 identical to the inlet check valve member 95 seals against an annular flat sealing surface 106 in the chamber 82 encircling the arm 81 of the constant volume chamber 75. The check valve member 105 is retained between the fitting 101 and the socket 100.

The inlet check valve member 95 permits the flow of liquid from the inlet conduit 11 into the constant volume chamber 75, while preventing the flow of liquid in the reverse direction. In contrast, the outlet check valve member 105 permits the flow of liquid under pressure from the constant volume chamber to the outlet conduit 16, while preventing the flow of liquid in the reverse direction. Liquid is drawn by suction into the constant volume chamber 75 and the variable volume chamber 54 from the inlet conduit 11 as the diaphragm 50 moves from the "top" position shown in FIGURE 1 to the "bottom" position shown in FIGURE 6. The liquid is pumped outwardly to the outlet conduit 16 as the diaphragm 50 moves from the "bottom" to the "top."

The diaphragm 50 is moved from the bottom to the top by the motor 27 through the medium of the cam 28. When the diaphragm 50 is at the top, the cam 28 has moved or rotated to where its cam surface 115 sliding against the cam follower surface 116 on the piston head member 63 has reached a point of maximum eccentricity. As the cam 28 continues to rotate, the coil spring 65 drives the piston 47 and, accordingly, the diaphragm 50 toward the bottom. The cam follower surface 116 continues to follow the cam surface 115, of course. The diaphragm 50 sequentially draws fluid into the chamber 75, 54 from the inlet conduit 11, and pumps it out of these chambers under pressure to the outlet conduit 16.

During the pumping cycle, or when the diaphragm 50 is moving from the bottom to the top, the convex surface 72 on the diaphragm 50 is forced against the concave depression 70 in the head 46 to empty the chamber 54 of liquid being pumped. Since the radius of the convex surface 72 is slightly greater than the radius of the concave surface 70, however, the annular periphery 120 of the convex surface 72 engages the annular periphery 121 of the concave depression 70 before the rest of the convex surface 72 engages the remainder of the concave depression 70. As the diaphragm 50 continues to move toward its top, a continually increasing proportion of the convex surface 72 is forced against the concave depression 70 until the last portion of the cavity 54 remaining is immediately adjacent the leg 76 of the fixed volume chamber 75 in the cylinder head 46.

The head 71 of the diaphragm 50 is thus gradually squeezed in toward the middle of the concave depression 70 in the cylinder head 46. The amount of squeeze is calculated so that even under the highest outlet pressure conditions, wherein there is a tendency to cause the rubber material of the diaphragm 50 to contract, the diaphragm 50 completely voids the cavity 54. Due to this relationship and to the minimal volume of the fixed volume cavity 75, a constant pumping rate is achieved at various outlet pressures with extremely high volumetric efficiency.

Of course, the pumping capacity of the pump unit 25 is determined by the length of stroke which the piston 47 and, accordingly, the diaphragm 50 can take. To adjust the pump capacity, a nurled ring 125 is threaded onto the cylinder barrel 35, as at 126, and carries a limiting stop flange 127 extending inwardly from its outer periphery. The flange 127 limits withdrawal of the piston 47 from the cylinder 40 at any preset point.

As the pump unit 25 draws liquid in from the conduit 11 and discharges it to the conduit 16 under pressure, the check valve members 95 and 105 of the pump unit automatically perform the necessary inlet and exhaust valving functions, as has been pointed out. Each valve member 95 and 105 enhances the constant pressure maintenance feature of the pump unit by consistently providing a perfectly fluid tight seal regardless of the presence of foreign matter particles such as chemical precipitates or the like on their respective sealing surfaces 90 and 106. In fact, each of the check valve members 95 and 105 is actually effective to automatically self-clean the corresponding sealing surface 90 or 106 as the check valves operate.

Each check valve member 95 or 105 is formed entirely of rubber or a similarly suitable material. They are identical in construction and operation and, accordingly, only the check valve member 95 is described here in detail. Corresponding reference numerals are applied to corresponding components of the check valve member 105.

Figure 6:
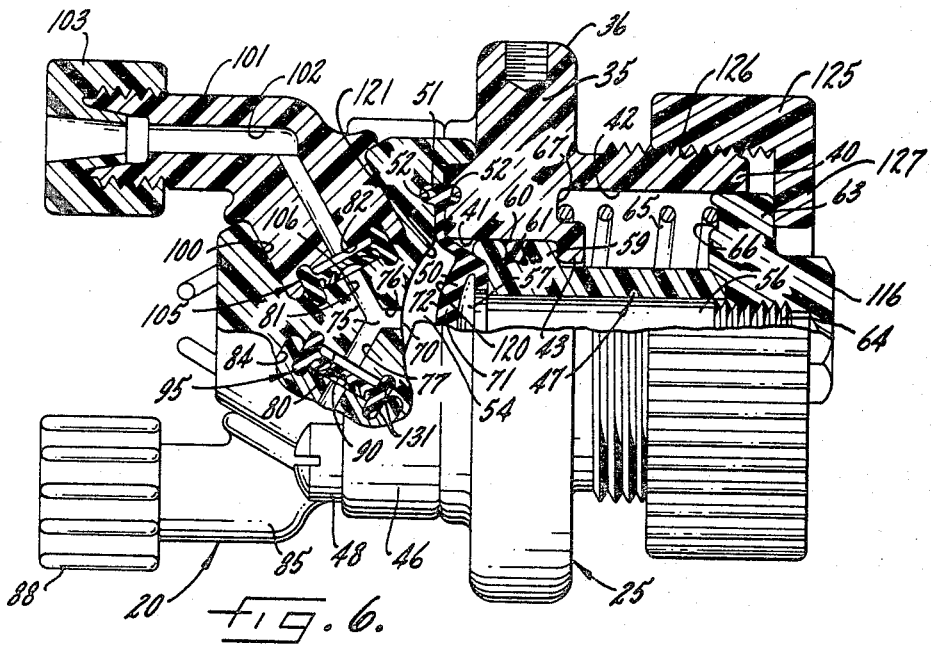
FIGURE 6 is an enlarged front elevational view, partially in section, of an individual liquid pump unit from the pumping and injection system embodying features of the present invention.
Figure 7:
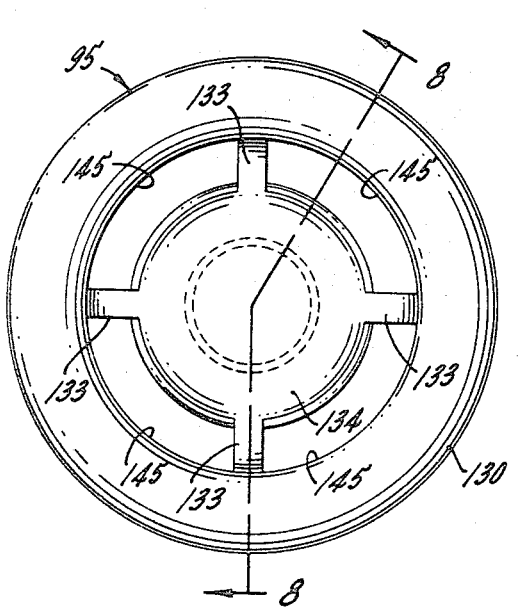
FIGURE 7 is an enlarged plan view of a check valve incorporated in the pump unit illustrated in FIGURE 6 and embodying features of the present invention.
Figure 8:
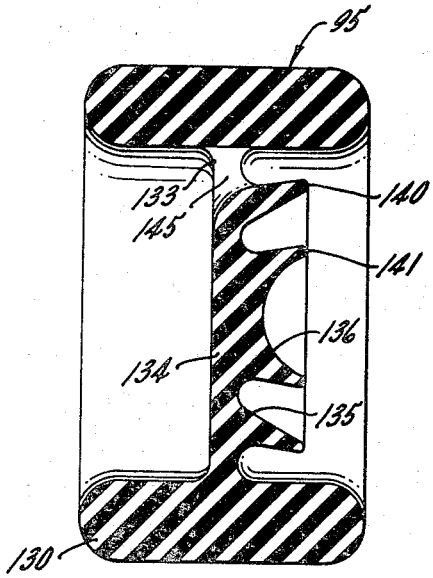
FIGURE 8 is a sectional view taken along line 8—8 of FIGURE 7.

Referring to FIGURES 6–8, the inlet check valve member 95 is seen to comprise a cylindrical rim 130 clamped between the inlet fitting 85 and the socket 84. The rim 130 seats in opposed annular recesses 131. Formed within the confines of the rim 130 on four rubber ribs 133 is the valve core 134.

The valve core 134 includes an outer cup section 135 and an inner cup section 136 formed concentrically therewith. The outer cup section 135 has an annular sealing lip 140 comprising an elongated, normally upstanding wall which engages and seals against the flat surface 90 in the inlet fitting 85. Correspondingly, the inner cup section has an annular sealing lip 141 comprising an elongated, normally upstanding wall which also engages and seals against the flat surface 90. The check valve member 95 is positioned in the check valve chamber 80 so that the lips 140 and 141 normally come into light engagement with the surface 90 when no liquid pressure is exerted on either side of the valve core 134.

As the piston 47 and, accordingly, the diaphragm 50 retract in the cylinder 40, suctions draw the core 134 away from the surface 90. Liquid flows into the constant volume chamber 75 (and the variable volume chamber 74) past the lips 141, 140, through the arcuate openings 145 between the ribs 133. At the same time, the valve core 134 of the outlet check valve member 105 is drawn tightly against the flat surface 106, preventing the flow of liquid from the outlet conduit 16 back into the chambers 75, 54. As the valve core 134 of the outlet check valve member 105 is flattened against the surface 106, the walls distend and the lips 140 and 141 slide outwardly on the surface 106, sweeping it clean of any deposited chemical precipitate, for example.

When the piston 47 and, accordingly, the diaphragm 50 moves toward the top in a pumping stroke, the valve core 134 of the outlet check valve member 105 is lifted off the sealing surface 106 and liquid is pumped past the valve core 134 through the openings 145 in the valve. Correspondingly, the sealing member 134 of the inlet check valve member 95 is flattened against the flat sealing surface 90. The lips 140 and 141 sweep the sealing surface 90 clean of any foreign material particles.

The check valve members 95 and 105 seal perfectly again and again as the pump units 25 cyclically pump chemicals cut through the outlet conduits 16. Even in the presence of particles of foreign material, such as chemical precipitate or the like, the check valve members 105 and 95 are effective because their multiple sealing lips 140 and 141 envelope and actually seal over particles. In sealing and unsealing, the lips 140 and 141 sweep such particles off the surfaces 90 and 106.

As has been pointed out, the chemicals which are discharged to the outlet conduits 16 are brought together in the flow rate indicator 17 and delivered to the water service line 15 or the like through the injection assembly 21 embodying features of the present invention. The flow rate indicator assembly 17 includes a generally T-shaped fitting 150 formed of transparent plexi-glass or the like. The fitting 150 includes a cross member 151 having a passage 152 extending through its length. The passage 152 is in communication with the outlet conduit 16 at its opposite ends, the outlet conduits 16 being connected to the cross member 151 by coupling members 155. A flow indicator passage 156 extends through the leg 157 of the T-shaped member 150 and is connected to the passage 152 through a slightly smaller diameter passage 158. The passage 156 is connected into the injector assembly 21 embodying features of the present invention and has a flow rate indicator ball 160 mounted for sliding movement therein. The rate of chemical solution flow through the passage 156 is measured by the amount which the ball 160 is forced upwardly in the passage 156, the passage 156 being slightly tapered.

The injector assembly 21 according to the present invention includes a generally cylindrical pipe section 166 externally threaded at 167 on its opposite ends for threading into the internal threads 168 in a down stream line section 169 and an up stream line section 170 of the water service line 15 or the like. A cylindrical bore 173 extends through the pipe section 166 and contains an injector nozzle 174.

The injector nozzle 174 comprises a substantially bullet shaped body 180 mounted concentrically with the bore 173 on radially extending vanes 181. As will be noted, there are three vvanes 181 and each is canted at a substantial angle to the axis of the bore 173 so as to induce rotation of liquid passing from the up stream pipe section 170 to the down stream pipe section 169 thereof. The aerodynamic shape of the leading end 182 on the nozzle 180 minimizes turbulence in the injector assembly 21.

As the water, for example, swirls past the nozzle 180 in the bore 173, chemicals are introduced from the down stream face 185 of the body 180 through a nozzle jet 186. The nozzle jet 186 is connected through the angulated passage 187 in the body 180 and a vane 181 with the passage 156 in the fitting 150. The fitting 150 is threaded into a lateral extension 188 of the pipe section 166.

In the injector nozzle jet 186 is centered in the circular flat surface 185 on the downstream end of the body 180 as the water swirls past the bullet shaped body 180, its flow rate causes a void or gas pocket to form over the nozzle jet 186 on the face 185. Accordingly, the chemicals squirting out of the jet 186 do not contact the swirling water until it has departed the immediate vicinity of the jet 186 and any precipitation from the chemicals effected by contact with the water does not build up in surrounding relationship with the jet.

The swirling effect of the water passing the bullet shaped body 180 causes complete and intimate mixing of the chemicals with the water. Accordingly, the chemicallly treated water can be removed to service virtually immediately downstream from the injection assembly 21 without finding localized concentrations of the chemicals in the water.

While the embodiment described herein is at present considered to be preferred, it is understood that various modifications and improvements may be made therein, and it is intended to cover in the appended claims all such modifications and improvements as fall within the true spirit and scope of the invention.

What is claimed is:

1. A check valve arrangement, comprising: a valve chamber having an inlet port, a substantially planar surface formed in said chamber around said port, a valve member in said chamber overlying said port, said valve member including an annular rim, a valve core resiliently connected to said rim within its periphery, said core having annular resilient lip means overlying said port and sealing against said surface, said lip means comprising at least two concentric annular resilient lips, said lip means lifting off said surface to permit liquid flow into said chamber from said port and flattening out against said surface to prevent flow of liquid out of said chamber to said port, the movement of said lip means on said surface as flow through the check valve is instituted and interrupted serving to wipe said surface clean of particulate material.

2. The check valve arrangement of claim 1 further characterized in that said core comprises an outer cup element and an inner cup element, said outer cup element having one of said resilient lips formed on its periphery, and said inner cup element having another of said resilient lips formed on its periphery.

3. A check valve arrangement, comprising: a valve chamber having an inlet port, a substantially planar surface formed in said chamber around said port, a valve member including a cylindrical rim clamped in said chamber around its periphery, a valve core connected to said rim within its periphery by resilient rib means, said core having annular resilient lip means overlying said port and sealing against said surface, said lip means including an elongated, normally upstanding wall extending toward said surface, said lip means lifting off said surface to permit liquid flow into said chamber from said port, said wall distending and sliding outwardly on said surface to prevent flow of liquid out of said chamber to said port, the movement of said lip means on said surface as flow through the check valve is instituted and interrupted serving to wipe said surface clean of particulate material.

4. The check valve arrangement of claim 3 further characterized in that said valve core comprises an outer cup means connected to said resilient ribs, and an inner cup means inside and concentric with said outer cup means, said resilient lip means comprising a resilient lip formed on each of said cup means.

5. A check valve arrangement, comprising: a valve chamber having an inlet port, a substantially planar surface formed in said chamber around said port, a valve member in said chamber overlying said port, said valve member including an annular rim, a valve core resiliently connected to said rim within its periphery, said core including unitarily formed cup means having an annular resilient lip around its edge overlying said port and sealing against said surface, said lip including an elongated, normally upstanding wall extending toward said surface, said lip lifting off said surface to permit liquid flow into said chamber from said port, said wall distending and sliding outwardly on said surface to prevent flow of said liquid out of said chamber to said port, the movement of said lip on said surface as flow through the check valve is instituted and interrupted serving to wipe said surface clean of particulate material.

References Cited

UNITED STATES PATENTS

| | | | |
|---|---|---|---|
| 2,707,481 | 5/1955 | McPherson | 137—218 |
| 2,710,978 | 6/1955 | Alderfer | 137—525 X |
| 2,713,953 | 7/1955 | Jewell | 137—525 X |
| 2,758,609 | 8/1956 | Dickert et al. | 137—525 |
| 2,784,732 | 3/1957 | Nurkiewicz | 251—333 X |
| 3,126,907 | 3/1964 | Tischler et al. | 251—333 X |

FOREIGN PATENTS 465,242   8/1951   Italy.

WILLIAM F. O'DEA, *Primary Examiner.*

D. J. ZOBKIW, *Assistant Examiner.*

U.S. Cl. X.R.

137—525